Patented Mar. 4, 1947

2,416,925

UNITED STATES PATENT OFFICE 2,416,925

PRESSURE-SENSITIVE ADHESIVE SHEET MATERIALS

Milton H. Kemp, Oak Park, Ill., assignor to The Kendall Company, Boston, Mass., a corporation of Massachusetts No Drawing. Application July 27, 1943,
Serial No. 496,307

3 Claims. (Cl. 117—122)

This invention relates to pressure-sensitive adhesive sheet materials, and more particularly to surgical adhesive tapes.

Crude rubber has for many years been a basic ingredient of successful surgical tape adhesives. When crude rubber is present in sufficient proportion, and proper formulation is observed, the crude rubber does impart to an adhesive those characteristics expected of a good quality surgical tape adhesive, and standards for surgical tape have been based, both officially and unofficially, upon the performance of adhesives which have about a 30% crude rubber content.

Thus the 11th revision of the U. S. Pharmacopoeia currently in force sets forth the following standard for surgical tape rating:

"The plaster mass . . . must contain about 30 per cent of pure rubber."

The Federal Standard Stock Catalog, U-P-401, sec. IV (part 5) of June 30, 1936, also currently in force, provides:

"C-1a. Type I plaster, adhesive, surgical, shall be made of a cotton fabric backing, coated on one side with an adhesive mass containing not less than 30 percent of thoroughly washed, new rubber . . ."

Both of these official standards illustrate the point that satisfactory surgical tape quality has been considered to be wholly dependent upon formulation with 30 percent pure rubber.

Now that the supply of crude rubber is problematical, the maintenance of standards derived from its unlimited use has become an acute problem in the surgical tape field.

The main object of this invention is to provide an adhesive tape which conforms to the requirements necessary for classification as a surgical adhesive tape, but which can be compounded with substantial savings in crude rubber without lowering the quality of the tape below the standards required for surgical tape use. Since tapes made in accordance with this invention are suitable for surgical tape use even though a 30% crude rubber content is not present in the adhesive thereof, it becomes necessary to define standards for determination of suitability of adhesives for use as surgical tape adhesives other than by crude rubber content. Such other standards have always heretofore been met in high quality 30% rubber content surgical tape adhesives and are more critical than the mere rubber content standard. These other standards, aside from desirable commercial attributes relating to color, odor and skin irritability, are as follows:

1. *Unrolling.*—First and foremost is the major requirement that the tape be capable of being unwound when rolled upon itself, in the absence of interliners, without ruinous separation or delamination of the adhesive mass through transfer of the mass to the underlying layer of the roll. This capability is imparted to an otherwise satisfactory adhesive by reason of an inherent elasticity in the mass which can be observed in a present-day 30% crude rubber adhesive type of surgical tape by the tendency of the mass to extend and snap back as it is unrolled from the underlying layer during the unrolling process.

2. *Adhesion.*—As referred to in this application, adhesion is determined by laying a strip of the tape to be tested, 1 inch wide and of convenient length, tacky surface down upon a smooth surfaced Bakelite panel, under temperature conditions of 70° F. The panel is then placed in a 15° inclined position and a 7 lb. roller, which is free to move vertically, is passed over the strip at the rate of 1 foot per minute up and back to adhere the pressure-sensitive surface to the panel. One end of the strip is then attached to the clamp of a tensile strength Scott tester and the average number of pounds required to pull a substantial length of tape off the Bakelite surface at an approximate 180° angle and at a rate of 1 foot per minute is determined. A minimum adhesion for surgical tape use is an average of ¾ of a pound, and a desirable minimum adhesion is closer to 1¼ pounds.

This adhesion test is more critical than the adhesion test contained in the above referred to section of the Federal Standard Stock Catalog, paragraphs D-5 and F-2b, wherein the test involves a straight pull and not a 180° angle stripping.

3. *Aging.*—Within the meaning of this specification, aging is determined by an accelerated test. This test is designed to simulate in one week the effects of a year's oxidation under decidedly adverse storage conditions. It comprises storage of the tape under 300 pounds oxygen pressure at 105° F. for a period of one week. Thereafter the tape should still meet the minimums for adhesion and creep described in paragraphs 2 and 4 hereof, and be capable of satisfactory unrolling as described in paragraph 1.

4. *Cohesion.*—This standard is determined by a creep test which involves laying a 1 inch strip of the tape of several inches length, tacky side down, over a horizontally disposed, raised, 1 inch diameter Bakelite cylinder, and suspending a 1 pound weight from each end of the tape. The apparatus is then placed in an oven at 105° F. for a period of fifteen minutes. The tape is then slashed across the top of the cylinder, the cylinder being provided with any necessary slot for permitting such slashing. The time required for either portion of the tape to fall from the cylinder represents the "creep" of the tape.

The minimum creep for the purposes of surgical tape is ten minutes, and preferably a tape should not separate from the cylinder in this test until after 25 or 30 minutes. As will be understood, a flypaper or other similar soft mass would, under the above test at 105° F., slide off the cylinder almost instantaneously.

In the production of surgical adhesive tapes in accordance with this invention, it is therefore contemplated that the tapes will conform to each and all of the above standards for unrolling, minimum adhesion, aging and cohesion, despite a substantial crude rubber content reduction.

Because crude rubber has heretofore been unrestrictedly available for industrial tape use as well as for surgical tape use, many industrial tapes have adhesives, following the practice established in the surgical tape field, formulated with the 30% crude rubber content, and often with even a greater rubber content. When bearing adhesives so formulated, industrial tapes may conform to all the above surgical tape standards.

On the other hand, it is widely recognized that standards for some industrial pressure-sensitive adhesive tapes may be much less strict than the standards pertaining to surgical tape. For instance, for some industrial purposes, it is not necessary that the tapes fulfill requirement 1. Such tapes need not be rolled upon themselves either during manufacture or merchandising. Under such circumstances, there is much wider latitude in the permissible choice of an adhesive than in the preparation of tapes which must, like surgical tape, fulfill requirement 1 as to unrolling. Some pressure-sensitive adhesives having reduced rubber content are, therefore, described only in connection with the preparation of industrial sheets or tapes which are designed for packaging in flat sheet form, not roll form; or are designed for roll packaging only when faced with separator sheets or interliners. Reduced rubber content has been permissible in such cases because softness and lack of cohesion of the adhesive is counteracted by the use of the slip sheets.

Again, one of the important and frequent uses of surgical tape is in strapping injured body portions. Here the adhesive sheet is relied upon to give actual support to injured body parts, and maintenance of the desired support is directly dependent upon portions of the tape remaining anchored in the applied position, as prescribed by the skill of the physician during initial application. This quality is controlled by the creep of the tape. It should have a minimum of creep —that is, it should have sufficient grab and mass cohesion to maintain the sheet in proper position without undue tendency to slip relative to the surface to which it has been applied, and thus reduce such supporting tension as the physician may have chosen to use at the time of its application.

This quality of creep, together with adequate adhesion, is difficult to attain in the absence of the usual 30% crude rubber content, and, while pressure-sensitive adhesive tapes for industrial use, wherein the creep quality may not be so strict, may be formulated with reduced crude rubber content, such adhesive tapes do not have a creep standard, in conjunction with the ability to unroll, sufficient to permit their use in the field as a surgical tape.

A usual formula for a high quality surgical adhesive tape adhesive which will meet all of the above standards, contains ingredients in about the following proportions:

| | Per cent |
|---|---|
| Crude rubber | 30 |
| Normally solid resin (rosin) | 28 |
| Zinc oxide | 20–25 |
| Non-volatile liquid plasticizer (mineral oil or lanolin) | 4–5 |
| Inert filler (starch) | 7–8 | together with small quantities of wax, anti-oxidant, and stain inhibitor.

It will be noted that the ratio of rosin to rubber in the above given formula is less than 1 to 1, and universal observation of this 1 to 1 rubber-resin ratio as a maximum has been the rule in commercial formulation of surgical adhesives conforming to the standards as defined above. Often and commonly the rosin to rubber ratio has been much lower. If the rosin percentage is raised above the crude rubber percentage, the adhesive becomes resinous in character with very bad physical effects. In the main, the increase in rosin content so reduces the elasticity that the mass is too hard and inelastic to meet the adhesion standard previously referred to; and if, in an attempt to counteract the hardness, the plasticizer content is increased, the mass will lose its cohesion and become soft and mushy or, anyway, be incapable, in tape form, either of satisfactory unrolling, or of meeting the minimum standards for creep or adhesion or both. Published literature sustains this prevailing recognition of the importance of maintaining a rubber to resin ratio not less than 1 to 1 in rubber-resin adhesives. Increase of rosin and/or plasticizer cannot therefore be looked to as a means for reducing the rubber percentage.

In accordance with this invention, I have found it possible to reduce the crude rubber content of pressure-sensitive adhesives for surgical tape to as low as about 20% of the adhesive mass and below the resinous constituent content while avoiding the usual bad physical effects and thus maintaining the necessary standards of cohesion, adhesion and aging. I have found further that this may be accomplished when and if a resin having a much higher melting point than that of commonly used rosins and resins is used as the whole or a substantial part of the solid resin constituent of the adhesive. The melting point of a satisfactory solid resin must exceed 195° F., (ball and ring method A. S. T. M.), in marked contrast to the melting points of the ordinary solid resins, such as wood rosin, hydrogenated rosin, ester gums, etc., which range from about 160 to 175° F. When such a higher melting point resin is used, I find that, despite reduction in rubber content, the adhesive can hold increased amounts of secondary non-volatile liquid plasticizers, such as mineral oil and lanolin, whereby the resinous inelastic tough qualities caused by the higher resin to rubber ratio may be overcome but without disastrous increase in softness. As a consequence, the filler content, that is, the zinc oxide and starch or equivalent constituents, may also be increased to secure a combined over-all saving in rubber percentage.

The invention therefore is based upon a complete revision of accepted practice with regard to rubber-resin ratio in surgical pressure-sensitive adhesive formulation.

In general, the high melting point resin constitutes from one-half to all of the solid resin constituents which makes up about 25% of my adhesive; zinc oxide, starch or other pulverulent filler, such as titanium dioxide, lithopone, etc., together range from about 30 to 45%, and the plasticizer constituent ranges from 8 to 11%. The crude rubber content may then be reduced to less than 22½%, but should be about 20% (i. e. 20+2½%). It will thus be noted that my non-volatile liquid plasticizer content has been roughly doubled, and my filler content likewise increased.

A typical formula in accordance with this invention is as follows:

|  | Per cent |
|---|---|
| Crude rubber | 20 |
| Resin (melting point—exceeding 195° F.) | 25 |
| Zinc oxide | 32 |
| Secondary non-volatile liquid plasticizer | 11 |
| Starch | 10 |
| Wax and anti-oxidants | 2 |

A high melting point resin which I have found to act most satisfactorily is a resin known as Poly-pale resin (Hercules Powder Co.), which has a melting point in the range from 198 to 201° F., and which is described in a bulletin of the Naval Stores Department of Hercules Powder Company entitled "Poly-pale resin" and bearing a 1941 copyright notice and the notation "Her. 400–250 1500 10–41" and in a 2d edition of that bulletin dated July 1942 and bearing a 1942 copyright and the notation "Her. 400–250A 2M 9–42," as a resin formed by treatment of rosin to react unsaturated resin acid constituents thereof, such as abietic and pimaric acids, through their double bonds to form polymers in a concentration of approximately 40% with the remaining portion being the normal constituents of the rosin. The normal ethylenic unsaturation of abietic acid has been reduced by the polymerization to render it oxidation resistant.

As directed by experience to date, the above represents the apparent maximum saving (33% more or less) in rubber content possible with the use of my invention. Substantial saving (over 25%) in rubber content, without quite as great loss of tack, can be achieved in accordance with the following formula, where the rubber content is increased to 22% of the adhesive, and the high melting point resin is used as only a portion of the solid resin constituent:

|  | Per cent |
|---|---|
| Crude rubber | 22 |
| Solid resin constituents: |  |
|    Poly-pale resin—melting point=198–201° F. (ball and ring) | 13 |
|    Hydrogenated rosin—melting point=160–170° F | 12 |
| Zinc oxide | 32 |
| Starch | 11 |
| Secondary non-volatile liquid plasticizer | 8 |
| Wax and anti-oxidants | 2 |

The creep results on cloth tape of such an adhesive, run as high as 72 minutes, and remain close to 30 minutes even after the aging test in the bomb has been conducted. The adhesion is over 1¼ lbs. and the tack is excellent both before and after aging. Such a tape will readily unroll without adhesive delamination both before and after the one-week aging test.

Other high melting point resins, compatible with the other ingredients in the proportions used, and sufficiently oxidation-resistant to permit the tape to survive the bomb test may be used. Nypene resin, a polymerized trepene, being a polymerized beta pinene derived from turpentine, produced by the Neville Company, and having a melting point of about 300° F., was found, from experience gained prior to its removal from the market, to accomplish the purposes of this invention. Despite the present limited number of such resins, I do not conceive that my invention is dependent upon the use of Poly-pale resin, but that similar results can be secured with other resins which have its physical properties, namely a melting point exceeding 195° F., plus a sufficient degree of resistance to oxidation to permit the adhesive to survive the bomb test heretofore referred to. The invention therefore resides in the use of such high melting point oxidation-resistant resins for the purpose of permitting, and in conjunction with, increased plasticization without mushiness, with or without increased filler content, and corresponding reduction in crude rubber content, without loss of the necessary qualities for surgical tape use, as hereinbefore defined.

The adhesives of this invention may be mixed in accordance with conventional adhesive formulation practice on a rubber mill or in a Banbury mixer and can be spread on a suitable backing, such as cloth, on a calender, also in accordance with conventional practice to provide an adhesive tape having a preformed substantially uniform coat of pressure-sensitive adhesive, pressure-united to a backing. Mixing and calendering may thus be performed without the use of volatile rubber solvents. Generally the crude rubber is preliminarily broken down in the mill before the other ingredients are added. In general, the coat should, on a cloth backing, amount to from 4½ to 7 ounces per square yard.

While surgical tape is generally manufactured with cloth backings, it should be understood that when used in this application, the term "surgical tape" is used as a standard of quality of the adhesive as spread on the tape, and is not used with any limiting significance, either as to the type of backing, which may be cloth, paper, regenerated cellulose, or any other type of flexible backing, or as to the use of the tape which may be surgical, industrial, or otherwise. Therefore, regardless of its backing and regardless of its designed use, a tape is considered a surgical tape within the meaning of this application and as bearing a surgical tape adhesive within the meaning of this application whenever the tape will meet the standards herein set forth for surgical tape adhesives.

Melting points referred to in the accompanying claims are to be determined by the A. S. T. M. ball and ring method.

I claim:

1. A surgical adhesive tape comprising a flexible sheet backing having on one side thereof a coating of a normally tacky pressure-sensitive surgical adhesive consisting essentially of the following ingredients in the following amounts by weight of the adhesive: crude rubber less than 22.5% and of the order of 20%, 30 to 45% filler, 8 to 11% non-volatile liquid plasticizer and about 25% of a normally solid resin constituent, at least one-half of said resin constituent being treated rosin (Poly-pale resin) containing approximately 40% polymeric abietic and other resin acids and having a melting point of 198–201° F.

2. A surgical adhesive tape comprising a flexible sheet backing having on one side thereof a coating of a normally tacky pressure-sensitive surgical adhesive consisting essentially of the following ingredients in the following amounts by weight of the adhesive: crude rubber less than 22.5% and of the order of 20%, 30 to 45% filler, 8 to 11% non-volatile liquid plasticizer and 10 to 25% of treated rosin (Poly-pale resin) containing approximately 40% polymeric abietic and other resin acids and having a melting point of 198–201° F.

3. In the manufacture of surgical adhesive tape bearing a pressure-sensitive surgical adhesive having as constituents thereof crude rubber, normally solid resin, non-volatile liquid plasticizer and filler, the step of reducing the crude rubber content in the formulation of the pressure-sensitive adhesive without detrimental reduction in the cohesive characteristics of the adhesive, comprising restricting the amount of crude rubber to about 20% by weight of the adhesive and to less than the amount of normally solid resin constituent, including as at least one-half of said resin constituent treated rosin (Poly-pale resin) containing approximately 40% polymeric abietic and other resin acids and having a melting point of 198–201° F. and increasing the non-volatile liquid plasticizer content to 8 to 11%, and the filler content to 30 to 45% by weight of the adhesive.

MILTON H. KEMP.

REFERENCES CITED

The following references are of record in the file of this patent:

UNITED STATES PATENTS

| Number | Name | Date |
| --- | --- | --- |
| 1,315,109 | Garlick | Sept. 2, 1919 |
| 2,021,063 | Henharen | Nov. 12, 1935 |
| 2,164,359 | Strauch | July 4, 1939 |
| 2,106,133 | Goldman | Jan. 18, 1938 |
| 2,187,563 | Thomas | Jan. 16, 1940 |
| 2,208,619 | Armor et al. | July 23, 1940 |
| 2,331,894 | Drew | Oct. 19, 1943 |